United States Patent [19]
Degrand et al.

[11] Patent Number: 5,807,796
[45] Date of Patent: Sep. 15, 1998

[54] LAMINATE COMPRISING A NONWOVEN IN ASSOCIATION WITH A THERMOPLASTIC FILM AND METHOD FOR MAKING IT

[75] Inventors: Michel Degrand, Bernay; Marie-Noëlle Chausset, Lavera, both of France

[73] Assignee: Elf Atochem, S.A., Paris, France

[21] Appl. No.: 733,632

[22] Filed: Oct. 17, 1996

[30] Foreign Application Priority Data

Oct. 17, 1995 [FR] France ................................. 95 12135

[51] Int. Cl.⁶ .................................................... B32B 27/00
[52] U.S. Cl. ...................... 442/398; 156/308.2; 442/400; 442/401
[58] Field of Search ...................... 442/398, 400, 442/401; 156/308.2

[56] References Cited

U.S. PATENT DOCUMENTS

| | | |
|---|---|---|
| 4,753,840 | 6/1988 | Van Gompel . |
| 4,797,171 | 1/1989 | Van Gompel . |
| 5,217,795 | 6/1993 | Sasse et al. . |
| 5,346,955 | 9/1994 | Sasse et al. . |

FOREIGN PATENT DOCUMENTS

| | | |
|---|---|---|
| 0267610 A2 | 5/1988 | European Pat. Off. . |
| 0474123 A1 | 3/1992 | European Pat. Off. . |

*Primary Examiner*—James J. Bell
*Attorney, Agent, or Firm*—Pennie & Edmonds LLP

[57] ABSTRACT

A laminate is provided comprising a) a non-woven based on fibers obtained from a mixture of a polyolefin and an ethylene copolymer; and (b) a thermoplastic film comprising a thermoplastic polymer and an ethylene copolymer.

23 Claims, No Drawings

LAMINATE COMPRISING A NONWOVEN IN ASSOCIATION WITH A THERMOPLASTIC FILM AND METHOD FOR MAKING IT

BACKGROUND OF THE INVENTION

This invention relates to a novel laminate comprising a nonwoven product in association with a thermoplastic film, and its method of preparation.

Nonwoven articles have been known for many years, and their use has continuously been on the increase. Thus, their application has extended to new fields, such as sanitary or hygiene products which are in contact with the skin.

European Patent Application 0,187,725 discloses laminates comprising a nonwoven base ply and a thermoplastic film. It is stated that the nonwoven has a feel similar to that of a soft or silky fabric on the side thereof which is not covered by the film and is in contact with the skin. Such laminates are typically used for producing disposable diapers and other hygiene articles.

When such products are used in contact with the skin, it is desirable for the nonwoven to have conventional mechanical properties in association with an improved feel and appearance. One thus looks for "silky" nonwoven products.

European Patent Application 0,527,447 discloses, among other things, a nonwoven based on a mixture of 50 to 90 weight % of a (meth)acrylic ester/(meth)acrylic acid copolymer, 5-30 weight % of modified polyolefin and 1-10% of polyetheresteramide. Such nonwovens exhibit stability properties in the presence of urine, higher mechanical strength and do not adhere when stored in rolls. There is no mention in that patent application of the nonwoven being "soft" or "silky"; on the contrary, it is necessary to add a polyethylene in the conventional fashion, in order to confer a certain degree of flexibility on the nonwoven.

Moreover, nonwovens are widely used in association with thermoplastic films, which have the barrier properties sought in numerous areas. Thus, the nonwovens should desirably have improved adhesion on the non-woven side, notably, the thermoplastic film should readily adhere to the nonwoven.

In European Patent Application 0,187,725, the laminates comprise a base ply consisting of a nonwoven with a thermoplastic film bonded to the nonwoven. The thermoplastic film is heat-bonded onto the nonwoven, which has densified and undensified portions whereby the depth of penetration of the film into said nonwoven is limited to less than the overall thickness of the nonwoven base ply. Application of the thermoplastic film is consequently difficult, and adhesion is relatively weak.

Further, there is a need for nonwovens in which the thermoplastic film also has improved appearance and touch.

SUMMARY OF THE INVENTION

This invention resolves the problems recited above, and in particular provides a new laminate comprising a nonwoven having a silky appearance and feel, in association with a thermoplastic film.

Thus, the invention provides a laminate comprising:
(a) a nonwoven based on fibers obtained from a mixture of:
  (i) a polyolefin; and
  (ii) a copolymer comprising ethylene and (meth)acrylic acid or an alkyl ester thereof or a salt thereof, and/or a copolymer comprising ethylene and vinyl acetate; and
(b) a thermoplastic film comprising:
  (iii) a thermoplastic polymer, and
  (iv) a copolymer comprising ethylene and (meth)acrylic acid or an alkyl ester thereof or a salt thereof, and/or a copolymer comprising ethylene and vinyl acetate.

In a preferred embodiment, the polymer (i) of said fibers is polypropylene.

In one embodiment, the copolymer (ii) of said fibers is preferably selected from the group comprising:
 copolymer of ethylene and (meth)acrylic acid, optionally functionalized with maleic anhydride;
 copolymer of ethylene with alkyl (meth)acrylate, optionally functionalized with maleic anhydride;
 copolymer of ethylene and (meth)acrylic acid and vinyl acetate, optionally functionalized with maleic anhydride;
 copolymer of ethylene and alkyl (meth)acrylate and vinyl acetate, optionally functionalized with maleic anhydride.
 copolymer of ethylene, alkyl (meth)acrylate and of an unsaturated dicarboxylic acid anhydride such as maleic anhydride or of an unsaturated epoxyde such as glycidyl (meth)acrylate;
 copolymer of ethylene, vinyl acetate and an unsaturated dicarboxylic acid anhydride such as maleic anhydride or of an unsaturated epoxyde such as glycidyl (meth)acrylate; and
 mixtures of the above copolymers.

According to one embodiment, an anti-blocking agent and/or slip-enhancing agent is added to said copolymer (ii).

According to another feature, the polymers (i) and (ii) of the fibers are present in a weight ratio comprised between 50/50 and 99/1, preferably between 70/30 and 90/10.

The thermoplastic film is, according to another embodiment, a film of a thermoplastic elastomer having polyether blocks, preferably a polymer having polyether blocks and polyamide blocks.

According to yet another embodiment, the copolymer (iv) of said thermoplastic film is selected from the group comprising:
 copolymer of ethylene and (meth)acrylic acid, optionally functionalized with maleic anhydride;
 copolymer of ethylene with alkyl (meth)acrylate, optionally functionalized with maleic anhydride;
 copolymer of ethylene and (meth)acrylic acid and vinyl acetate, optionally functionalized with maleic anhydride;
 copolymer of ethylene and alkyl (meth)acrylate and vinyl acetate, optionally functionalized with maleic anhydride.
 copolymer of ethylene, alkyl (meth)acrylate and of an unsaturated dicarboxylic acid anhydride such as maleic anhydride or of an unsaturated epoxyde such as glycidyl (meth)acrylate;
 copolymer of ethylene, vinyl acetate and an unsaturated dicarboxylic acid anhydride such as maleic anhydride or of an unsaturated epoxyde such as glycidyl (meth)acrylate;
 mixtures of the above copolymers; and
 the above copolymers optionally mixed with polyolefins, said polyolefins being optionally-functionalized.

In accordance with another embodiment, the copolymer (iv) of said thermoplastic film is substantially identical to the copolymer (ii) of said fibers.

An anti-blocking agent and/or slip-enhancing agent is, according to yet another embodiment, added to said thermoplastic film.

In one embodiment, the thermoplastic polymer (iii) and the copolymer (iv) are present in a weight ratio of between 50/50 and 99/1, preferably between 70/30 and 90/10.

In another embodiment of the invention, the thermoplastic film is bonded without the use of adhesive to said nonwoven.

According to another embodiment, the nonwoven is obtained by the spun or spun/melt blown technique.

The invention further provides a method for preparing a laminate, in which said thermoplastic film (b) is layed or hot laminated onto said nonwoven (a).

DETAILED DESCRIPTION

In this present application, the term "fiber" covers threads and filaments, what is known in the trade as stable fibers and, in general terms, any material obtained by a spinning process. Notably, the term "fiber" covers the result of melt spinning a polymer, in other words a "thermoplast".

Here, the term "polyolefin" covers homopolymers or copolymers of alpha-olefins or di-olefins.

Such olefins are, by way of example, ethylene, propylene, butene-1, octene-1, butadiene.

The following can be mentioned as typical examples:

polyethylene PE, polypropylene PP, copolymers of ethylene and alpha-olefins. Such polymers can be grafted with unsaturated carboxylic acid anhydrides such as maleic anhydride or unsaturated epoxides such as glycidyl methacrylate.

copolymers of ethylene with one or several products selected from: (a) unsaturated carboxylic acids and salts or esters thereof; (b) saturated carboxylic acid vinyl esters such as vinyl acetate; (c) unsaturated di-carboxylic acids and salts, esters, hemiesters, anhydrides thereof; and (d) unsaturated epoxides; care being taken that the polyolefin (i) is different from copolymer (ii). The amount of comonomer stays fairly low, depending on the nature of the comonomer, typical amounts being 2 to 5% by weights as is conventional in the art. These ethylene (co)polymers can be grafted with unsaturated carboxylic acid anhydrides or unsaturated epoxides.

styrene-based block copolymers, and notably those comprising polystyrene and polybutadiene sequences (SBS), polystyrene and polyisoprene sequences (SIS), polystyrene and poly(ethylene-butylene) sequences (SEBS), such copolymers optionally being functionalized with maleic anhydride.

The above copolymers can be randomly copolymerized or sequenced, and have a linear or branched structure. The homopolymers are advantageous for use in the manufacture of nonwovens.

The term polyolefin also covers mixtures of several of the polyolefins mentioned above. For example, homopolymer PE or PP may be doped with functionalized PE or PP or doped with other functionalized (co)polymer(s).

One can, for example, use:

polyethylene (HDPE, LDPE or VLDPE), ethylene/alpha-olefin copolymers, ethylene/vinyl acetate (EVA) copolymers, ethylene/vinyl alcohol (EVOH) copolymers; and polypropylene, which is the preferred polyolefin.

The molecular weight of the polyolefins can vary over a wide range as will be understandable to those skilled in the art. For example, the molecular weight can be comprised between 1,000 and 1,000,000.

The characteristics of the polyolefin will be more particularly adapted for their use for the manufacture of nonwovens, although other uses could be envisaged. Notably, the polyolefins will advantageously have a low melting point, high fluidity (with, for example, a melt index at 230° C. and under a 2.16 kg load comprised between 20 and 40), a narrow molecular distribution, will not include non-melted components, and will be homopolymers.

In this application, the expression "a copolymer comprising ethylene and (meth)acrylic acid or an alkyl ester thereof or a salt thereof, and/or a copolymer comprising ethylene and vinyl acetate" represents the result of copolymerizing the corresponding monomers. An alkyl ester is an alkyl (meth)acrylate. A salt is an acid salt with, generally, a metal.

As typical examples of salts, we can notably mention salts used in ionomer resins, for example the zinc salt.

The alkyl group of the alkyl (meth)acrylate included in copolymer (ii) and/or (iv) can have up to 10 carbon atoms and can be linear, branched or cyclic. As illustrations of alkyl (meth)acrylate, we can notably mention n-butyl acrylate, isobutyl acrylate, ethyl-2-hexyl acrylate, cyclohexyl acrylate, methyl methacrylate, ethyl methacrylate, glycidyl methacrylate. Among such (meth)acrylates, methyl methacrylate, ethyl acrylate, methyl acrylate and butyl acrylate are preferred.

The ethylene/alkyl (meth)acrylate copolymers can be terpolymerized with an unsaturated carboxylic acid anhydride such as maleic anhydride or with an unsaturated epoxyde such as glycidyl (meth)acrylate.

The ethylene/alkyl (meth)acrylate copolymers can also be grafted with an unsaturated carboxylic acid anhydride such as maleic anhydride or with an unsaturated epoxyde such as glycidyl (meth)acrylate.

These ethylene copolymers could also be mixed with other polymers conventionally employed in mixtures, such as, for example, polyolefins (when such copolymers are employed in the film).

The following can be mentioned as typical examples of such copolymers:

copolymers of ethylene with (meth)acrylic acid, optionally functionalized with maleic anhydride;

copolymers of ethylene with alkyl (meth)acrylate, optionally functionalized with maleic anhydride;

copolymers of ethylene and (meth)acrylic acid and vinyl acetate, optionally functionalized with maleic anhydride;

copolymers of ethylene and alkyl (meth)acrylate and vinyl acetate, optionally functionalized with maleic anhydride.

Functionalization can be done both by terpolymerisation of maleic anhydride or of glycidyl methacrylate as well as by grafting with the same monomers.

The EMA and EBA copolymers are preferred, optionally functionalized with maleic anhydride by terpolymerisation or grafting.

The ethylene copolymers contain the comonomer in amounts that are conventional in the art. For example, the monomer content can vary from 2 to 50%, and preferably from 5 to 40%. Such copolymers generally have a relatively low melting point, for example below 120° C.

Mixture of the above copolymers are also envisaged as are mixtures of these copolymers with conventional fillers.

Such copolymers are commercially available from Elf Atochem under the names Lotryl® and Lotader®.

In this invention, the anti-blocking and/or slip-enhancing agent is/are employed in amounts of from 0.01 to 2% by weight, preferably from 0.1 to 1.5% by weight based on the ethylene copolymer.

Such agents are for example selected from mineral fillers, the amides and ethylene-bis amides of unsaturated fatty acids having at least 8 carbon atoms. Typical examples of such agents are silica, talc, zinc stearate, stearic, palmitic, erucic, myristic and behenic amides, ethylene-bis oleamide, ethylene-bis-erucamide and ethylene-bis-stearamide. As examples of preferred substances, talc and/or ethylene-bis stearamide and/or ethylene-bis-oleamide can be mentioned. Nevertheless, the use of silica, talc and zinc stearate will be avoided in the mixture for making spun fibers.

In this present application, the "nonwoven" stands for any material covered by the generic English term nonwoven. A definition of what this covers, with details of some preparation methods, is that given in "Nonwoven Fabrics" by Fahrbach, Schaut, and Weghmann in Ullmann's Encyclopedia of Industrial Chemistry, 5th edition, Vol.A17, pp 565–587.

The nonwovens of the invention are prepared using the conventional techniques described in the above publication. The nonwovens can be spunbonded or can be prepared by any other method, such as spun lacing or hydrodynamically forming (wet-laid), chemical bonding, thermal bonding, stitch bonding or can be melt blown or air laid. Composite nonwovens also come within the scope of this invention.

Advantageous results are obtained with spun nonwovens or spun/melt blown composites.

The nonwovens according to the invention have conventional characteristics, their weight being comprised between 10 and 30 g/m2, fiber diameter being comprised between 1.5 and 4 dtex, and preferably between 1.8 and 2.2 dtex.

Components (i) and (ii) of the instant nonwoven may form bicomponent fibers (see the above-mentioned publication of Ullmann's, page 568). Notably, the fibers can be of the side-by-side type, core and sheath type, orange-type, matrix and fibrils type. For example, components (i) and (ii) can be respectively the core and sheath in te core and sheath type bicomponent fiber.

In this application, the term "thermoplastic film" means a thermoplastic-based film of conventional thickness.

Film thickness is conventional and depends of the final use of the laminate, as those skilled in the art will understand. By way of example, thickness is comprised between 10 and 500 $\mu$m, for example between 10 and 80 $\mu$m, preferably between 15 and 35 $\mu$m, or, by way of further example, between 100 and 500 $\mu$m, preferably between 150 and 400 $\mu$m depending on the final use of the laminate.

The term "thermoplastic" such as used in this specification corresponds to the definition conventionally accepted by those skilled in the art.

In particular, but without this being limited, reference can advantageously be made to the definition given in "Thermoplastic Elastomers" by Abdou-Sabet, Wussow, Ryan, Plummer, Judas and Vermière in Ullmann's Encyclopedia of Industrial Chemistry, 5th edition, Vol.A26, pp 633–664.

The thermoplastic in this invention is any thermoplastic, for example mixture of EPR-type polyolefins (TPO); vulcanisates (TPV), for example EPDM; polyurethanes (TPU); copolyesters; polyether block thermoplastic polymers, in particular having polyamide blocks and polyether blocks.

The thermoplastic elastomer providing advantageous results may comprise polyether and polyester units, for example blocks. These thermoplastic elastomers are known under the name of elastomer polyesters, and are thermoplastic.

The polyethers are, for example, polyethylene glycol, polypropylene glycol or polytetramethylene glycol. The mass Mn of such polyethers can be comprised between 250 and 6,000.

The soft (flexible) segments of the elastomer polyesters are formed by the preceding polyether units and at least one carboxylic diacid, such as for example terephtalic acid. The flexible segments may comprise several units resulting from the action of a polyether on a diacid.

The rigid (hard) segments of the elastomer polyesters comprise glycol, propanediol or butanediol-1,4 units and carboxylic diacid units linked by ester functions. The carboxylic diacids can be the same as the above. The rigid segments may comprise several units resulting from the action of a diol on a diacid.

The soft segments and the rigid segments are attached by ester bonds. Such elastomer polyesters are described in European Patent Applications 0,402,883 and 0,405,227 which are incorporated herein by reference.

The thermoplastic elastomers having polyether units can also be copolyetherimide ester. The soft segments are formed by the reaction of polyether diamines with tricarboxylic compounds or carboxylic acid anhydrides containing a carboxylic group such as, for example, trimellitic anhydride. The polyether diamines have an average molecular weight of 600 to 2,000. These polyether diamines can themselves originate from polyethylene glycol, polypropylene glycol or polytetramethylene glycol.

The polyester blocks forming the rigid segments of the ester copolyetherimide ester are for example the result of condensing at least one diol with at least one carboxylic diacid. The diol can be glycol, propanediol or butanediol. The diacid can be terephtalic acid. Such copolyetherimide ester are described in European Patent Applications 0,402,883 and 0,405,227 which are incorporated herein by reference.

The polyether block thermoplastic elastomers can also be polyurethanes. They are formed by chaining the three basic components: (i) a polyetherdiol such as, for example, a polyethylene glycol, a polypropylene glycol or a polytetramethylene glycol, with a molecular weight from 500 to 6,000; (ii) a diisocyanate such as an MDI or TDI; and (iii) a low mass diol such as glycol, butanediol-1,4 or 1,4-phenylene-bis-$\beta$-hydroxy ether as chain extender.

The thermoplastic elastomers can also be polyamide block and polyether block polymers.

These polyamide block and polyether block polymers result from copolycondensation of reactive-termination polyamide sequences with reactive-termination polyether sequences such as, without this list being limiting:

polyamide sequences having diamine terminations with polyoxyalkylene sequences having dicarboxylic terminations;

polyamide sequences having dicarboxylic terminations with polyoxyalkylene sequences having diamine terminations obtained by cyanoethylation and hydrogenation of aliphatic dihydroxylated alpha-omega polyoxyalkylene sequences known as polyetherdiols;

polyamide sequences having diamine terminations with polyetherdiol sequences, the products obtained being in this particular case, polyetheresteramides.

The dicarboxylic-terminated polyamide sequences originate, for example, from condensation of aminocarboxylic alpha-omega acids, of lactames or substantially stoechiometric combinations of carboxylic diacids and diamines, in the presence of a chain-limiting carboxylic diacid. Advantageously, the polyamide blocks are PA6 or PA12.

The average molecular weight Mn of the polyamide sequences varies between 300 and 15,000 and is preferably from 600 to 5,000.

The average molecular weight by number, Mn, of the polyether sequences is comprised between 10 and 6,000 and preferably between 200 and 3,000.

The polyamide block and polyether block polymers can also comprise randomly-distributed units. Such polymers can be prepared by simultaneously reacting polyether and polyamide block precursors.

For example, the reaction can be between a polyetherdiol, a lactame (or a corresponding alpha-omega aminoacid) and a chain-limiting diacid in the presence of a small amount of water. A polymer is obtained having essentially polyether blocks, polyamide blocks of greatly varying length, but also various reagents that have reacted randomly and which are randomly distributed along the polymer chain.

These polyamide block and polyether block polymers, whether they originate from copolycondensation of previously prepared polyamide and polyether sequences or from a single-step reaction typically have a Shore D hardness comprised between 20 and 75 and advantageously between 30 and 70, and an intrinsic viscosity comprised between 0.8 and 2.5, measured in metacresol at 25° C. for an initial concentration of 0.8 g/100 ml.

Whether or not the polyether blocks derive from polyethylene glycol, polyoxypropylene glycol or polyoxytetramethylene glycol, they are either used as such and copolycondensed with carboxylic-terminated polyamide blocks, or are aminated for transformation into polyether diamines and then condensed with carboxylic-terminated polyamide blocks. They can also be mixed with precursors of polyamide and a chain limiter in order to obtain polyamide block and polyether block polymers having randomly distributed units.

Such polyamide block and polyether block polymers are described in the following United States patents which are incorporated herein by reference: U.S. Pat. Nos. 3,331,786-4,115,475-4,195,015-4,839,441-4,864,014-4,230,838 and 4,332,920.

The polyether can, for example be a polyethylene glycol (PEG) a polypropylene glycol (PPG) or a polytetramethylene glycol (PTMG, also called polytetrahydrofurane, PTHF).

Whether or not the polyether blocks are in the polyamide block and polyether block polymer chain in the form of diols or of diamines, they will be referred to for the sake of simplicity as PEG blocks, PPG blocks or PTMG blocks.

If the polyether blocks were to contain other units, such as those derived from ethylene glycol, propylene glycol or tetramethylene glycol, they would not fall outside of the scope of the present invention.

Preferably, the polyamide block and polyether block polymer comprises one single type of polyamide block and one single type of polyether block. Advantageously, polymers having PA12 blocks and PEG blocks, polymers having PA12 and PTMG blocks, polymers having PA6 blocks and PEG blocks, and polymers having PA6 and PTMG blocks are employed.

Mixtures of polymers having polyamide blocks and polyether blocks can also be employed.

Advantageously, the polyamide block and polyether block polymer is such that the polyamide is the major weight constituent, in other words the amount of polyamide that is in the form of blocks and the amount which is possibly randomly distributed in the chain makes up at least 40% by weight of the polyamide block and polyether block polymer. Advantageously, the amounts of polyamide and the amount of polyether are in a weight ratio (polyamide/polyether) comprised between 1/1 and 3/1.

Such polyamide block and polyether block polymers are available commercially from Elf Atochem under the name Pebax®.

The thermoplastic polymer may also contain other polymers, such as polyolefins optionally carrying functions as described above.

The thermoplastic polymer film, notably the polyamide block and polyether block polymer film may also include anti-blocking and/or slip-enhancing agents in the same way as above.

Adding ethylene/alkyl (meth)acrylate copolymer improves the appearance and feel of the thermoplastic film.

For the purposes of this invention, two ethylene copolymers are substantially identical when their ethylene content is similar in the two ethylene copolymers and the comonomer is also similar. However, it is obvious that the invention can be implemented with ethylene copolymers other than these, without this being detrimental to the final results.

The laminates of the present invention are prepared by any suitable process. For example, an adhesive layer can be applied onto the nonwoven; such an adhesive can be a hot melt adhesive as described in European Patent Application 0,547,798 and 0,547,799.

Advantageously, the thermoplastic film is hot laminated onto the nonwoven.

The laminate according to the invention can be prepared for example, using the following method. In a first step known per se, a thermoplastic film is extruded using an extruder with an adjustable gap die, fed with a suitable mixture. In a second step, the extruded thermoplastic film, the temperature of which is at most equal to 320° C., and not yet solidified, is applied to a web of nonwoven by means of two rollers between which the nonwoven web and the thermoplastic film are passed. The roller that is in direct contact with the film can be chilled, it being then referred to as the chill roll. In a third optional step, the laminate can be fed to a stretching station.

Other conventional fillers can be incorporated both into the fiber and the nonwoven as well as into the thermoplastic film. Such fillers are, for example, stabilising agents, dyes, etc.

The laminate could contain further layers, regardless of whether these are layers of thermoplastic film or of nonwoven, or even layers of any other material without departing from the scope of this invention.

The nonwovens and the laminates according to the invention can be used in numerous fields, notably in the field of articles designed to come into contact with the skin, such as disposable articles of body hygiene, for example disposable diapers.

The invention will now be described in the following example, without this limiting the scope of the invention.

EXAMPLE

A mixture of polypropylene and an ethylene/alkyl acrylate copolymer is prepared, the polypropylene having the following characteristics:

melt index at 230° C. under 2.16 kg: about 30;

a narrow molecular distribution;

homopolymer;

absence of non-molten matter.

A first ethylene copolymer is provided having the following composition:

ethylene 93% butyl acrylate 17% melt index of 8 at 190° C. under 2.16 kg;

absence of non-molten matter.

A second ethylene copolymer is provided having the following composition:

ethylene 80% methyl acrylate 20% melt index of 8 at 190° C. under 2.16 kg absence of non-molten matter.

Two mixtures of polypropylene and ethylene copolymer in a weight ratio of 80/20 are prepared. In an extruder, a temperature profile and operating conditions similar to those employed for polypropylene are used.

The temperature profile is 220° C.–220° C.–230° C.–250° C.–245° C.

Fibers are obtained having a silky feel, and which lead to a spun nonwoven (1.5 to 4 dtex filament) having improved flexibility and feel, accompanied by a notable improvement in adhesion of a film by laying. Improved Corck Sheet Textile results are indeed obtained.

The adhesion onto a film of Pebax filled with these same ethylene copolymer is improved and facilitated.

The invention is not limited to the embodiments described but may be subject to numerous variations readily accessible to those skilled in the art.

Alkyl (meth)acrylate includes alkyl acrylate and alkyl methyl acrylate.

What is claimed is:

1. A laminate comprising:
   (a) a nonwoven based on fibers obtained from a mixture of:
      (i) a polyolefin; and
      (ii) a copolymer comprising ethylene and a monomer selected from the group consisting of (meth)acrylic acid, alkyl (meth)acrylates, (meth)acrylate salts, vinyl acetate, an unsaturated dicarboxylic acid anhydride such as maleic anhydride, an unsaturated epoxide such as glycidyl (meth)acrylate, or mixtures thereof; and
   (b) a thermoplastic film comprising:
      (iii) a thermoplastic polymer; and
      (iv) a copolymer comprising ethylene and a monomer selected from the group consisting of (meth)acrylic acid, alkyl (meth)acrylates, (meth)acrylate salts, vinyl acetate, an unsaturated dicarboxylic acid anhydride such as maleic anhydride, an unsaturated epoxide such as glycidyl (meth)acrylate, or mixtures thereof.

2. The laminate of claim 1, in which the polyolefin (i) of said fibers is polypropylene.

3. The laminate of claim 1, in which the copolymer (ii) of said fibers is selected from the group consisting of:
   copolymer of ethylene and (meth)acrylic acid;
   copolymer of ethylene with alkyl (meth)acrylate;
   copolymer of ethylene and (meth)acrylic acid and vinyl acetate;
   copolymer of ethylene and alkyl (meth)acrylate and vinyl acetate;
   copolymer of ethylene, alkyl (meth)acrylate and an unsaturated dicarboxylic acid anhydride such as maleic anhydride;
   copolymer of ethylene, alkyl (meth)acrylate and an unsaturated epoxide such as glycidyl (meth)acrylate;
   copolymer of ethylene, vinyl acetate and an unsaturated dicarboxylic acid anhydride such as maleic anhydride;
   copolymer of ethylene, vinyl acetate and an unsaturated epoxide such as glycidyl (meth)acrylate;
   or mixtures of the above.

4. The laminate of claim 3, in which the copolymer (ii) of said fibers is functionalized with maleic anhydride.

5. The laminate of claim 1 containing an additive added to said copolymer (ii), in which the additive is selected from the group consisting of an anti-blocking agent and a slip-enhancing agent or mixtures thereof.

6. The laminate of claim 1, in which the polymers (i) and (ii) of the fibers are present in a weight ratio comprised between 50/50 and 99/1.

7. The laminate of claim 6, in which the polymers (i) and (ii) of the fibers are present in a weight ratio comprised between 70/30 and 90/10.

8. The laminate of claim 1, in which said thermoplastic film is a film of a thermoplastic elastomer having polyether blocks.

9. The laminate of claim 2, in which said thermoplastic film is a film of a thermoplastic elastomer having polyether blocks.

10. The laminate of claim 8, in which the thermoplastic elastomer having polyether blocks is a polymer having polyether blocks and polyamide blocks.

11. The laminate of claim 1, in which the copolymer (iv) of said thermoplastic film is selected from the group consisting of:
   copolymer of ethylene and (meth)acrylic acid;
   copolymer of ethylene with alkyl (meth)acrylate;
   copolymer of ethylene and (meth)acrylic acid and vinyl acetate;
   copolymer of ethylene and alkyl (meth)acrylate and vinyl acetate;
   copolymer of ethylene, alkyl (meth)acrylate and an unsaturated dicarboxylic acid anhydride such as maleic anhydride;
   copolymer of ethylene, alkyl (meth)acrylate and an unsaturated epoxide such as glycidyl (meth)acrylate;
   copolymer of ethylene, vinyl acetate and an unsaturated dicarboxylic acid anhydride such as maleic anhydride;
   copolymer of ethylene, vinyl acetate and an unsaturated epoxide such as glycidyl (meth)acrylate;
   or mixtures of the above.

12. The laminate of claim 11, in which the copolymer (iv) of said thermoplastic film is mixed with a polyolefin.

13. The laminate of claim 11, in which the copolymer (iv) of said thermoplastic film is mixed with a functionalized polyolefin.

14. The laminate of claim 11, in which the copolymer (iv) of said thermoplastic film is functionalized with maleic anhydride.

15. The laminate of claim 11, in which the polyolefin (i) of said fibers is polypropylene.

16. The laminate of claim 1, in which the copolymer (iv) of said thermoplastic film is substantially identical to the copolymer (ii) of said fibers.

17. The laminate of claim 11, in which the copolymer (iv) of said thermoplastic film is substantially identical to the copolymer (ii) of said fibers.

18. The laminate of claim 1 containing an additive added to said thermoplastic film, in which the additive is selected from the group consisting of an anti-blocking agent and a slip-enhancing agent or mixtures thereof.

19. The laminate of claim 1 in which the thermoplastic polymer (iii) and the copolymer (iv) are present in a weight ratio of between 50/50 and 99/1.

20. The laminate of claim 19 in which the thermoplastic polymer (iii) and the copolymer (iv) are present in a weight ratio of between 70/30 and 90/10.

21. The laminate of claim 1, in which said thermoplastic film is bonded without the use of adhesive to said nonwoven.

22. The laminate of claim 1, in which said nonwoven is obtained by a method selected from the group consisting of spun and spun/melt blown.

23. A method for preparing the laminate of claim 1, in which said thermoplastic film (b) is processed onto said nonwoven (a) by a method selected from the group consisting of layed and hot laminated.

* * * * *